United States Patent [19]
Barnes et al.

[11] Patent Number: 5,357,912
[45] Date of Patent: Oct. 25, 1994

[54] ELECTRONIC CONTROL SYSTEM AND METHOD FOR A HYDRAULICALLY-ACTUATED FUEL INJECTION SYSTEM

[75] Inventors: Travis E. Barnes, Peoria; Bradley W. Harrell, Normal, both of Ill.

[73] Assignee: Caterpillar Inc., Peoria, Ill.

[21] Appl. No.: 23,279

[22] Filed: Feb. 26, 1993

[51] Int. Cl.$^5$ .................... F02D 31/00; F02D 7/00
[52] U.S. Cl. .................... 123/357; 123/381; 123/446
[58] Field of Search .............. 123/446, 381, 357, 358, 123/359, 456

[56] References Cited

U.S. PATENT DOCUMENTS

| | | | |
|---|---|---|---|
| Re. 33,270 | 7/1990 | Beck et al. | 123/447 |
| 4,368,705 | 1/1983 | Stevenson | 123/357 |
| 4,870,939 | 10/1989 | Ishikawa | 123/357 |
| 5,024,200 | 6/1991 | Free | 123/381 |
| 5,143,291 | 9/1992 | Grinsteiner | 123/446 |
| 5,152,266 | 10/1992 | Sekiguchi | 123/357 |
| 5,176,115 | 1/1993 | Campion | 123/446 |
| 5,181,494 | 1/1993 | Ausman et al. | 123/446 |
| 5,191,867 | 3/1993 | Glassey et al. | 123/446 |
| 5,245,970 | 9/1993 | Iwaszkiewicz | 123/446 |

FOREIGN PATENT DOCUMENTS 149598 7/1985 European Pat. Off. .

*Primary Examiner*—Carl S. Miller
*Attorney, Agent, or Firm*—Anthony N. Woloch

[57] ABSTRACT

An apparatus for controlling fuel injection parameters for fuel injection quantity, injection timing, and actuating fluid pressure of a hydraulically-actuated electronically-controlled fuel system. The apparatus utilizes signals indicative of actuating fluid pressure ($P_f$) and/or actuating fluid viscosity ($v$) in order to determine such parameters.

23 Claims, 4 Drawing Sheets

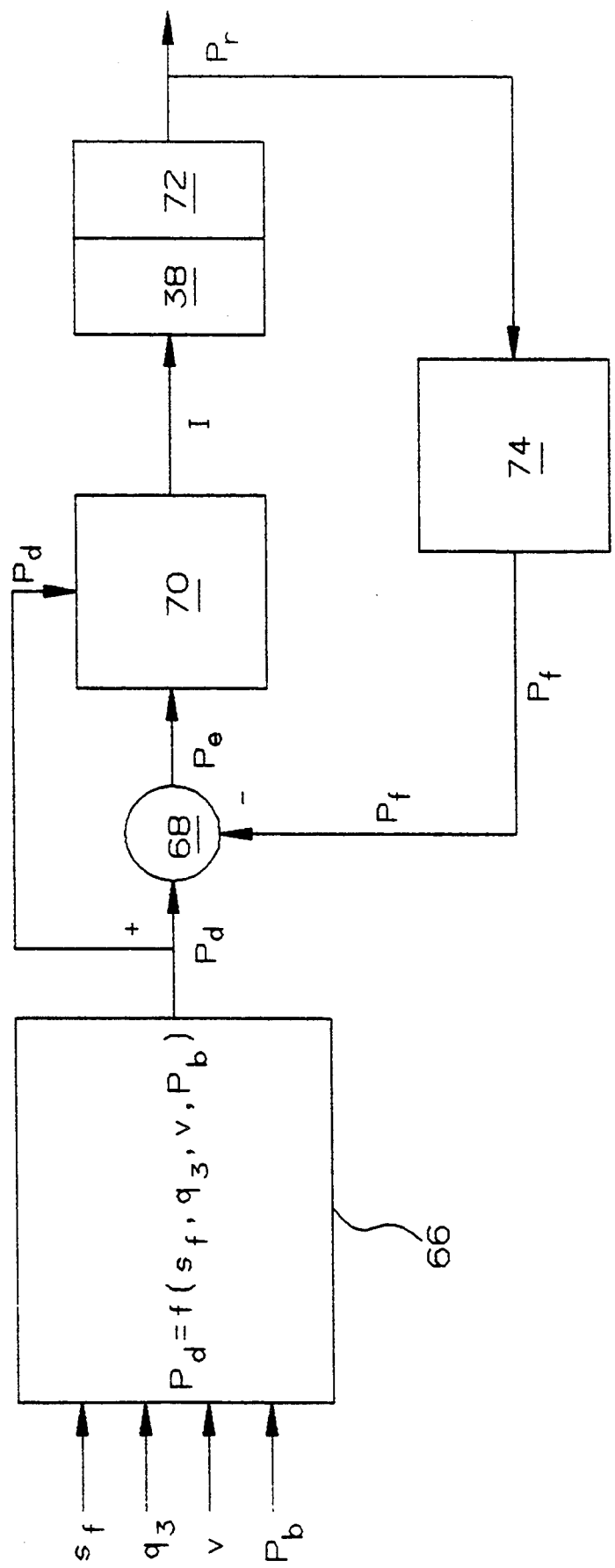

ELECTRONIC CONTROL SYSTEM AND METHOD FOR A HYDRAULICALLY-ACTUATED FUEL INJECTION SYSTEM

TECHNICAL FIELD

The present invention relates generally to hydraulically-actuated fuel injection systems and, more particularly to electronic control systems for independently controlling fuel quantity, injection timing, and actuating fluid pressure.

BACKGROUND ART

Known hydraulically-actuated fuel injector systems and/or components are shown, for example, in U.S. Pat. No. 5,191,867 issued to Glassey et al. on Mar. 9, 1993 and U.S. Pat. No. 5,181,494 issued to Ausman et al. on Jan. 26, 1993.

Such systems require an effective means for electronically controlling the fuel quantity, injection timing, and actuating fluid pressure. A known engine control system for a mechanically-actuated fuel system is shown in U.S. Pat. No. 4,368,705 issued to Stevenson et al. on Jan. 18, 1983. A known control system for an inlet-metered hydraulically actuated injector system is shown in U.S. Pat. No. Re. 33,270 issued to Beck et al. on Jul. 24, 1990.

The present invention is directed to overcoming one or more of the problems as set forth above.

DISCLOSURE OF THE INVENTION

In one aspect of the present invention an apparatus is disclosed which is adapted to electronically control a quantity of fuel that a hydraulically-actuated injector injects. The apparatus receives an actuating fluid pressure signal which is used to determine a time duration used to electronically actuate the injector in order to control fuel injection quantity independent of injection pressure.

In another aspect of the present invention an apparatus is disclosed which is adapted to electronically control the timing at which a hydraulically-actuated injector begins injection. The apparatus receives an actuating fluid pressure signal which is used to determine a time delay used to electronically actuate the injector in order to control fuel injection timing with a single timing signal.

In another aspect of the present invention an apparatus is disclosed which is adapted to electronically control the pressure of actuating fluid supplied to a hydraulically-actuated injector. The apparatus determines an actuating fluid pressure used to hydraulically actuate the injector which can be made independent of the fuel quantity injected.

BRIEF DESCRIPTION OF THE DRAWINGS

FIG. 4 is a block diagram of an actuating fluid pressure control strategy for the fuel system of FIG. 1.

BEST MODE FOR CARRYING OUT THE INVENTION

Figure 1:
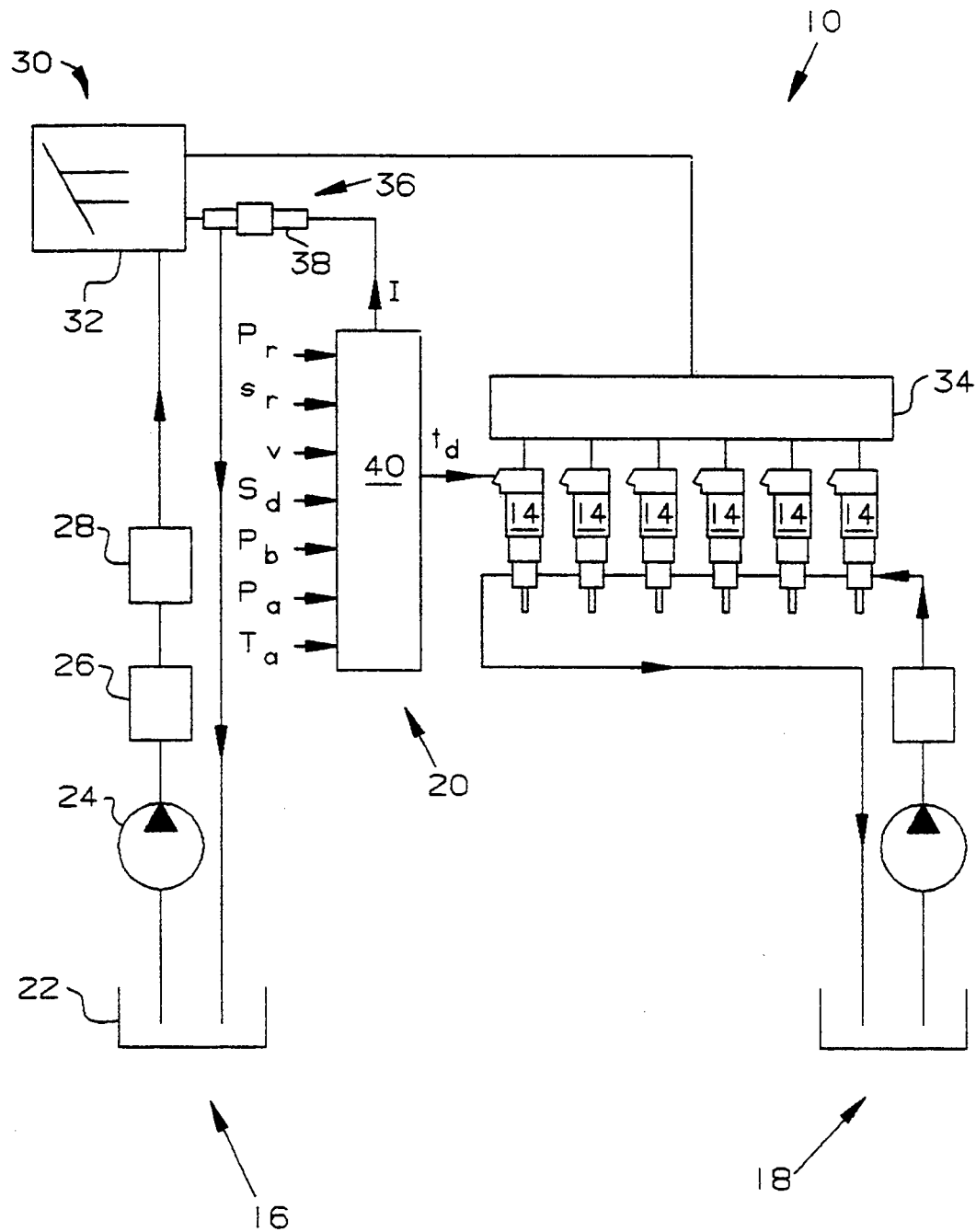
FIG. 1 is a diagrammatic general schematic view of a hydraulically-actuated electronically-controlled injector fuel system for an engine having a plurality of injectors.

Referring to FIG. 1, wherein similar reference numerals designate similar elements or features throughout FIGS. 2-4, there is shown an embodiment of a hydraulically-actuated electronically-controlled injector fuel system 10 (hereinafter referred to as a HEUI fuel system).

Figure 2:
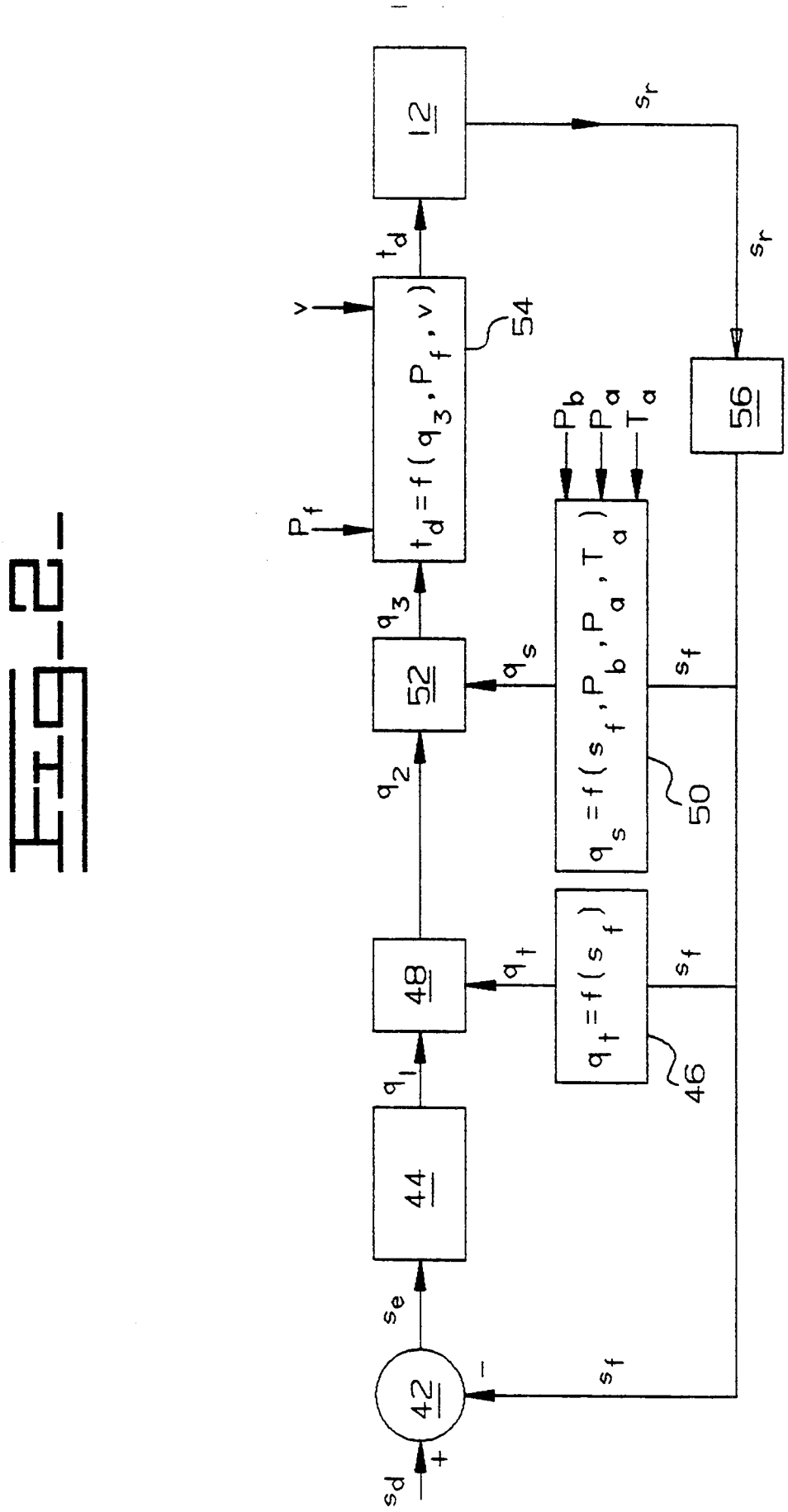
FIG. 2 is a block diagram of a fuel injection quantity control strategy for the fuel system of FIG. 1.
Figure 3:
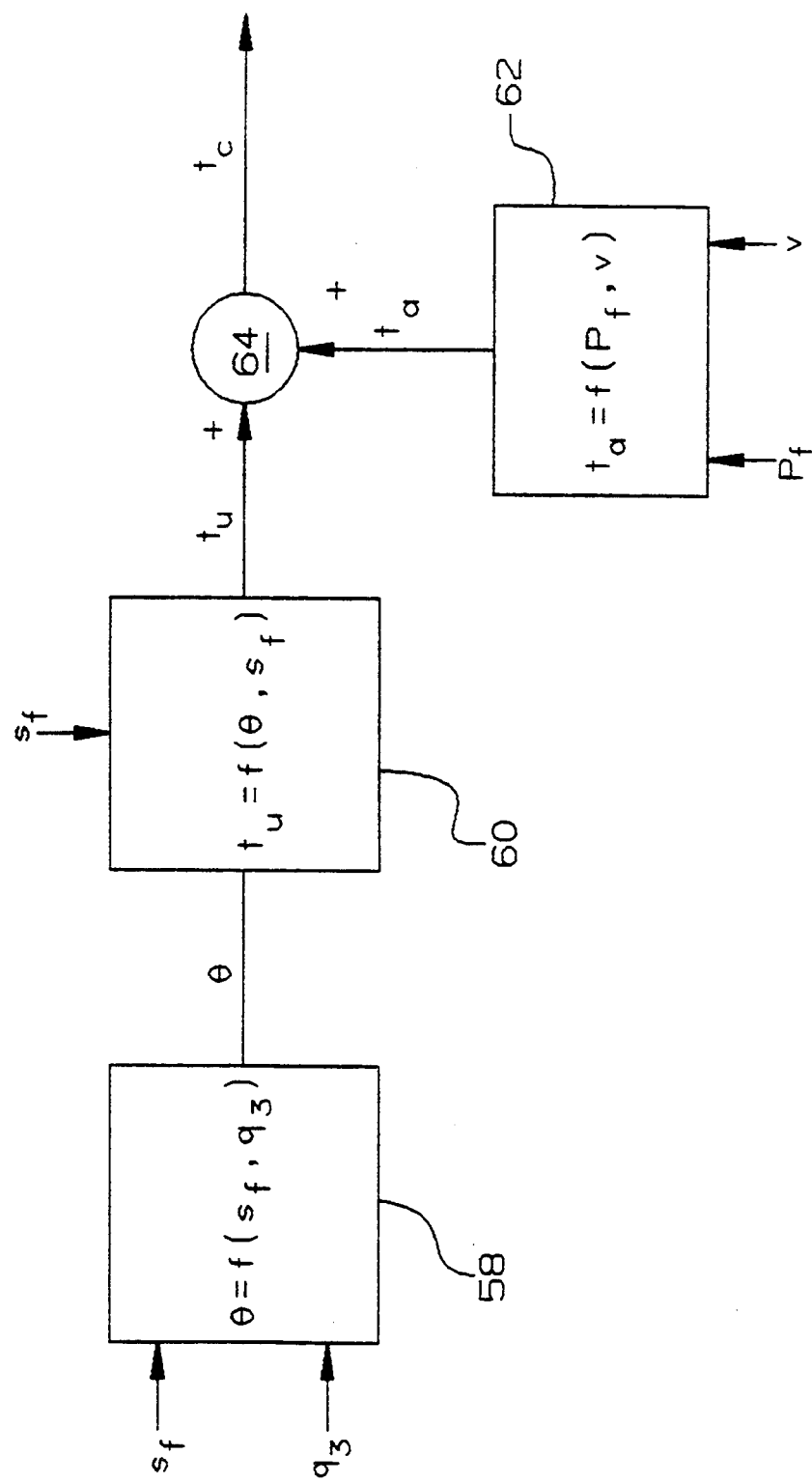
FIG. 3 is a block diagram of a fuel injection timing control strategy for the fuel system of FIG. 1.

The exemplary HEUI fuel system 10 is shown in FIG. 1 as adapted for a direct-injection diesel-cycle internal combustion engine 12 shown in FIG. 2. While the embodiment of FIG. 1 applies to an in-line six cylinder engine, it should be understood that the present invention is also applicable to other types of engines, such as vee-type engines and also rotary engines, and that the engine 12 may contain fewer or more than six cylinders or combustion chambers.

Referring again to FIG. 1, The HEUI fuel system 10 includes one or more hydraulically-actuated electronically-controlled injectors 14, such as unit pump-injectors, each associated with a respective combustion chamber of the engine 12. The system 10 further includes apparatus or means 16 for supplying hydraulically actuating fluid to each injector 14, apparatus or means 18 for supplying fuel to each injector 14, and apparatus or means 20 for electronically controlling the fuel injection quantity, injection timing, and/or actuating fluid pressure of the HEUI fuel system 10. Further details of an exemplary HEUI fuel system 10, not discussed here, are disclosed in U.S. Pat. No. 5,191,867 issued to Glassey et al. on Mar. 9, 1993.

The hydraulically actuating fluid supplying means 16 preferably includes an actuating fluid sump 22, a relatively low pressure actuating fluid transfer pump 24, an actuating fluid cooler 26, one or more actuating fluid filters 28, a source of high pressure actuating fluid or means 30 for pressuring actuating fluid such as a high pressure actuating fluid pump 32, at least one relatively high pressure actuating fluid manifold 34 arranged in fluid communication between the pressurizing means 30 and the injectors 14, and apparatus or means 36 for controlling the pressure of actuating fluid in the manifold 34. Preferably, the pump 32 is a gear-driven fixed-displacement axial piston pump and the means 36 is an electronically-controlled proportional pressure control valve 38 or rail pressure control valve which selectively bypasses a variable amount of actuating fluid from the pump 32 back to the sump 22. Alternatively, the pump 32 may be a variable displacement axial piston pump thereby eliminating the rail pressure control valve 38 hereinafter referred to as the RPCV.

Preferably, the fluid chosen for the actuating fluid is not fuel but is a relatively incompressible liquid having a relatively higher viscosity than fuel under the same conditions. Preferably, the actuating fluid is engine lubricating oil and the actuating fluid sump 22 is an engine lubrication oil sump. In the embodiment of FIG. 1, the pump 32 raises the actuating fluid pressure level from a typical engine operating oil pressure level to the actuation pressure level required by the injectors 14. The RPCV is electronically controlled by the means 20 to control the output pressure of the pump 32. The RPCV selectively causes a variable portion of the actuating fluid to bypass the manifold 34 and return directly back to the sump 22.

The means 20 for electronically controlling the fuel injection quantity, injection timing, and/or actuating fluid pressure of the HEUI fuel system 10 is preferably an digital microprocessor or electronic control module 40 hereinafter referred to as the ECM.

The ECM contains software decision logic and information defining optimum fuel system operational parameters and controls key components. Multiple sensor signals, indicative of various engine parameters are delivered to the ECM to identify the engine's current operating condition. The ECM uses these input signals to control the operation of the fuel system in terms of fuel injection quantity, injection timing, and actuating fluid pressure.

The software decision logic for determining the magnitude of the fuel injection quantity of each injector 14 to achieve a desired engine speed preferably uses at least five inputs: desired engine speed, measured engine speed, air inlet pressure such as air intake manifold or boost pressure, actuating fluid pressure, and actuating fluid viscosity which may be directly or indirectly sensed. A desired engine speed signal $s_d$ is delivered from one of several possible sources such as operator throttle setting, cruise control logic, power take-off speed setting, or environmentally determined speed setting due to, for example, engine coolant temperature. A speed comparing means 42 compares the desired engine speed signal $s_d$ with the measured engine speed signal $s_f$ to produce an engine speed error signal $s_e$. The engine speed error signal $s_e$ becomes the input to a set of mathematical equations and/or maps known as the engine control algorithm 44 whose output is a desired first fuel quantity signal $q_1$. The engine control algorithm 44 calculates the quantity of fuel that would be needed to accelerate or decelerate the engine speed to result in a zero engine speed error signal $s_e$.

The desired first fuel quantity $q_1$ is then preferably compared to one or more map(s) and/or mathematical equation(s) 46 whose outputs determine the maximum allowable fuel quantity $q_t$ based on one or more input signals. A first fuel quantity comparing means 48 compares the output $q_t$ from these maps and/or equations to the desired fuel quantity signal and the "least" value become the output $q_2$. The torque map and/or equation(s) 46 receives an actual engine speed signal $s_f$ and outputs the maximum allowable fuel quantity signal $q_t$ that preferably determines the horsepower and torque characteristics of that engine 12. The desired first fuel quantity $q_1$ is compared by the means 48 to the maximum allowable fuel quantity signal $q_t$ and the lower of the two values is passed on as a desired second fuel quantity signal $q_2$ for comparison with a another maximum allowable fuel quantity signal $q_s$ delivered by an emissions limiter map and/or equation(s) 50.

The emissions limiter map and/or equation(s) 50 may, for example, limit the amount of smoke produced by the engine 12. The emissions map and/or equation(s) 50 preferably has several possible inputs but primarily an air inlet pressure signal $P_b$ indicative of, for example, air manifold pressure or boost pressure. In the case of a smoke limiter, the output is the another maximum allowable fuel quantity signal $q_s$ that limits the quantity of fuel based on the quantity of air available to prevent excess smoke. The third fuel quantity signal $q_3$ is then output from means 52 as the resulting "least" value comparison of the second fuel quantity signal $q_2$ and the another maximum allowable fuel quantity $q_s$.

The third fuel quantity signal $q_3$ along with actuating fluid pressure $P_f$ and viscosity v become the three inputs into the fuel duration map and/or equation(s) 54 that converts the third fuel quantity signal $q_3$ into an equivalent time duration $t_d$ used to electronically control the solenoid of the injector 14. This fuel duration map and/or equation(s) 54 reflects the fuel delivery characteristics of the injector 14 to changes in actuating fluid pressure and viscosity. This time duration is adjusted (increased or decreased) by the output of the fuel delivery maps and/or mathematical equation(s) 54 whose inputs are an actuating fluid pressure signal $P_f$ and an actuating fluid viscosity signal v. This map and/or equation(s) 54 reflects the fuel delivery characteristics of the hydraulically-actuated injector 14 to changes in actuating fluid pressure and viscosity. For example, the time duration $t_d$ is made shorter if the actuating fluid pressure signal $P_f$ is relatively high. The time duration $t_d$ is made longer if the actuating fluid pressure signal $P_r$ is relatively low. The time duration $t_d$ is made longer if the viscosity signal v is relatively high. The time duration $t_d$ is made shorter if the viscosity signal v is relatively low. The resulting adjusted time duration $t_d$ is used to determine how long the current (I) to the solenoid of a respective injector 14 should remain "on" to inject the correct quantity of fuel from the injector 14 independent of injection pressure. Preferably, the raw actual engine speed signal $s_r$ is conditioned by means 56, such as a noise filter and/or frequency to digital convertor, to eliminate noise and convert the signal to a usable form.

The software decision logic for determining the magnitude of fuel injection timing for an injector 14 preferably uses at least four inputs: actual engine speed, desired fuel quantity, actuating fluid pressure and actuating fluid viscosity which may be directly or indirectly sensed. At least the actual engine speed signal $s_f$ and the desired fuel quantity signal $q_3$ are the inputs into the timing map(s) and/or equation(s) 58. Based on these input conditions, a desired fuel injection timing signal theta is selected as an output measured in engine crankshaft degrees. This desired timing signal theta along with the actual engine speed signal become the inputs to the mathematical time delay $t_u$. This uncorrected time delay $t_u$ is equation(s) and/or map(s) 60 that converts the desired timing signal theta into an equivalent uncorrected adjusted by means 64 (increased or decreased) by the output $t_a$ of a timing offset map and/or mathematical equation(s) 62 whose inputs are preferably an actuating fluid pressure signal $P_f$ and an actuating fluid viscosity signal v. This timing offset map and/or equation(s) 62 reflects the timing characteristics of the hydraulically-actuated injector 14 to changes in both or either the actuating fluid pressure signal $P_f$ and/or the actuating fluid viscosity signal v. The resulting adjusted time delay signal $t_c$ is used to determine when to send current I to the solenoid of a respective injector 14 to initiate fuel injection with a single signal.

The software decision logic for determining the magnitude of the actuating fluid pressure supplied to the injector 14 preferably uses at least four inputs: actual engine speed, desired fuel quantity, actual actuating fluid pressure and actuating fluid viscosity which may be directly or indirectly sensed. Preferably, at least the actual engine speed signal $s_f$, a desired fuel quantity signal $q_3$, and an actuating fluid viscosity signal v are the inputs into an actuating fluid pressure map and/or equation(s) 66. Alternatively, an air inlet pressure signal $P_b$ may be added as an input. Based on these three or more input signals, a desired actuating fluid pressure signal $P_d$ is selected as an output. The resulting output of desired actuating fluid pressure signal $P_d$ is compared by means 68 with an actual actuating fluid pressure signal $P_f$ to produce an actuating fluid pressure error signal $P_e$. This actuating fluid pressure error signal $P_e$ and the desired actuating fluid pressure signal $P_d$ become the input to a set of mathematical equations and/or maps 70 called the RPCV control algorithm whose output is a desired electrical current I applied to the RPCV. By changing the electrical current I to the RPCV the actuating fluid pressure $P_f$ can be increased or decreased. For example, increasing the current I to the RPCV causes the RPCV to bypass the actuating fluid directly to the sump 22 at a higher pressure thereby increasing the actuating fluid pressure in the manifold 34. Decreasing the current I to the RPCV causes the RPCV to bypass more actuating fluid to the sump 22 at a lower pressure thereby decreasing the actuating fluid pressure in the manifold 34. This RPCV control algorithm 70 calculates the electrical current I to the RPCV that would be needed to raise or lower the actuating fluid pressure $P_f$ to result in a zero actuating fluid pressure error signal $P_e$. The resulting actuating fluid pressure is used to hydraulically actuate the injector 14. Preferably, the raw actuating fluid pressure signal $P_r$ in the high pressure portion of the actuating fluid pressure circuit 72 is conditioned and converted by a conventional means 74 to eliminate noise and convert the to a usable form.

INDUSTRIAL APPLICABILITY

The actuating fluid circuit 16 consists of a low pressure section and a high pressure section. The low pressure circuit typically operates at a pressure of about 0.3 MPa (44 psi). Its function is to provide filtered actuating fluid, preferably in the form of lubricating oil, to the high pressure actuating fluid pump 32 as well as the lubricating oil system of the engine 12. Oil is drawn from the engine oil sump 22 and supplied through the oil cooler 26 and filter 28 to both the engine 12 and the high pressure actuating fluid pump 32.

The high pressure actuating fluid circuit provides actuation fluid to the injector 14 and operates in a pressure range preferably between about 4 to 23 MPa (about 580 to 3300 psi). This high pressure actuating fluid flows through lines into the manifold 34 located near the injectors 14. The manifold 34 stores the actuating fluid at a variable actuation pressure ready for injector operation. Preferably, actuating fluid is discharged from the injector 14 under the engine valve cover (not shown) so that no return lines are required.

The ECM 40 controls the pressure in the high pressure actuating fluid circuit 16 and thus fuel quantity injection pressure. Operational maps and/or mathematical equations stored in the ECM programmable memory identify the optimum actuating fluid pressure in the manifold or rail 34 for best engine performance.

The HEUI fuel system 10 provides many unique injection characteristics. Chief among these is injection pressure control over the entire engine speed range as disclosed in U.S. Pat. No. 5,191,867 issued to Glassey et al. on Mar. 9, 1993. In a typical mechanically-actuated fuel system, the injection pressure increases proportionally with engine speed while the injection pressure in the HEUI fuel system 10 is electronically controlled independent of engine speed. The ability for independent electronic control of injection pressure has proven advantages in smoke and particulate reduction and in greatly improved low speed engine response. System pressure response is quite fast. For example, in one engine application, the fuel injection pressure is adjustable from about 30 MPa to 120 MPa (about 4350 psi to 17,400 psi) in about 30 milliseconds (about 1 to 2 engine revolutions). Such adjustment of fuel injection pressure can be made independent of the quantity of fuel injected.

Since the HEUI fuel system 10 is time based, injection characteristics are independent of engine speed—unlike typical mechanically-actuated fuel systems whose characteristics slow down as engine speed is reduced. Injection duration, expressed in engine crankshaft degrees, remains constant or increases as engine speed is reduced for typical mechanically-actuated fuel systems. Injection duration, expressed in engine crankshaft degrees, with the HEUI fuel system 10, however, decreases proportionally with engine speed but can also be controlled by electronic control of the pressure of the actuating fluid supplied to the injectors 14. This characteristic is beneficial in improving engine performance and fuel consumption.

Another benefit of a time based system is complete flexibility in controlling injection timing. Injection timing can be optimized without concern for engine cam profile limitations. This flexibility provides proven advantages in lower emissions, reduced noise, reduced smoke, improved hot and cold starting, white smoke clean-up, and high altitude operation.

The ECM produces the waveforms required to drive the RPCV and an electronic actuator (such as a solenoid) of each injector 14. The ECM preferably includes the microprocessor(s) and interfaces to read engine sensors and perform the required calculations for fuel injection quantity, injection timing, and injection pressure for optimum engine operation.

The ECM preferably operates on either 12 volts or 24 volts, may be either fuel cooled or not, is generally engine mounted, and is available in a variety of configurations depending on engine requirements. One of the most important engine sensors is the engine speed/timing sensor. It reads the signature of a timing wheel applied to the engine camshaft to indicate the engine's rotational position and speed to the ECM. The ECM contains software filtering devices to eliminate false signals and/or speed spikes due to engine torsionals. Another important engine sensor is the actuating fluid pressure sensor. The ECM operates the RPCV in a closed loop control strategy using the signal from this sensor as an input. For accuracy, the actuating fluid pressure sensor is preferably located in the actuating fluid manifold 34 and is calibrated at the nominal engine operating temperature.

The current (I) applied to the injector 14 is preferably a two level waveform. For example, drive voltage is about 110 volts and typical power consumption is about 45 watts. The first portion of the waveform is controlled at a higher current level to ensure fast response of a poppet valve associated with each injector 14. As the poppet valve seats, the current level is reduced to lower system energy requirements and to speed the flux decay when the ECM is turned off. For each injection cycle, the initial slope of the current rise over time is controlled by the ECM driver voltage and the system resistance and inductance. Initial poppet valve acceleration is caused by the force of the injector solenoid. Fast response of the poppet valve to admit actuating fluid into the respective injector 14 is aided by hydraulic flow forces. Injection ends after the ECM shuts off the current waveform and the poppet valve returns to its closed position blocking the communication of high pressure actuating fluid to the injector 14 lower seat.

The need for excellent all-weather starting greatly challenged the actuating fluid supply circuit and cold operation software strategies. Two injection characteristics occur with the HEUI fuel system 10 when very high viscosity oil is used as the hydraulically actuating fluid. One characteristic is a delay in start of injection. The other characteristic is a reduced fuel output for a given logic signal. In order to offset these characteristics, programmable software maps and/or equations are included to selectively determine system actuating fluid pressure, adjust injection timing, and determine the effective waveform duration.

Other aspects, objects, and advantages of this invention can be obtained from a study of the drawings, the disclosure, and the appended claims.

We claim:

1. An apparatus adapted for electronically controlling a quantity of fuel that a hydraulically-actuated injector injects into an engine, said apparatus comprising:

means for determining a desired fuel quantity and delivering a first fuel quantity signal ($q_1$) indicative of the magnitude of said desired fuel quantity;

engine characteristic control means for determining a maximum allowable fuel quantity that limits at least one characteristic produced by the engine, and delivering a maximum allowable fuel quantity signal ($q_t$, $q_s$) indicative of the magnitude of said maximum allowable fuel quantity;

fuel quantity comparing means for comparing the first fuel quantity signal ($q_1$) to the maximum allowable fuel quantity signal ($q_t$, $q_s$), selecting a lesser value of the first fuel quantity signal ($q_1$) and the maximum allowable fuel quantity signal ($q_t$, $q_s$), and delivering a second fuel quantity signal ($q_2$, $q_3$) indicative of the magnitude of said selected lesser value;

means for sensing the pressure of actuating fluid used to hydraulically actuate the injector and delivering an actuating fluid pressure signal ($P_f$) indicative of the magnitude of said sensed actuating fluid pressure; and converting means for receiving said second fuel quantity signal ($q_2$, $q_3$) and the actuating fluid pressure signal ($P_f$), converting the second fuel quantity signal ($q_2$, $q_3$) into a time duration signal ($t_d$) that is a function of at least the actuating fluid pressure signal ($P_f$) and the second fuel quantity signal ($q_2$, $q_3$), and delivering the time duration signal ($t_d$) to the injector to electronically control said fuel quantity independent of fuel injection pressure.

2. The apparatus of claim 1 further including means for sensing the viscosity of actuating fluid used to hydraulically actuate the injector and delivering an actuating fluid viscosity signal (v) indicative of the magnitude of said sensed actuating fluid viscosity, said converting means further receiving the actuating fluid viscosity signal (v) and converting the second fuel quantity signal ($q_2$,$q_3$) into a time duration signal ($t_d$) that is a function of at least the actuating fluid pressure signal ($P_f$), the second fuel quantity signal ($q_2$, $q_3$), and the actuating fluid viscosity signal (v).

3. An apparatus adapted for electronically controlling a quantity of fuel that a hydraulically-actuated injector injects into an engine, said apparatus comprising:

means for sensing a desired engine speed and delivering a desired engine speed signal ($s_d$) indicative of the magnitude of said sensed desired engine speed;

means for sensing an actual engine speed and delivering an actual engine speed signal ($s_f$) indicative of the magnitude of said sensed actual engine speed ($s_f$);

speed comparing means for comparing the desired engine speed signal ($s_d$) with the actual engine speed signal ($s_f$) and producing an engine speed error signal ($s_e$) in response to a comparison between said compared engine speed signals ($s_d$, $s_f$);

engine control means for receiving the engine speed error signal ($s_e$), determining a quantity of fuel needed to adjust the actual engine speed so that the engine speed error signal ($s_e$) results in a magnitude of zero, and delivering a first fuel quantity signal ($q_1$) indicative of the magnitude of said determined quantity of fuel;

torque control means for determining a maximum allowable fuel quantity ($q_t$), that limits engine torque, and delivering a maximum allowable fuel quantity signal ($q_t$) indicative of the magnitude of said maximum allowable fuel quantity;

first fuel quantity comparing means for comparing the first fuel quantity signal ($q_1$) to the maximum allowable fuel quantity signal ($q_t$), selecting a lesser value of the first fuel quantity signal ($q_1$) and the maximum allowable fuel quantity signal ($q_t$), and delivering a second fuel quantity signal ($q_2$) indicative of the magnitude of said selected lesser value;

emission control means for determining another maximum allowable fuel quantity, that limits engine emissions, and delivering another maximum allowable fuel quantity signal ($q_s$) indicative of the magnitude of said another maximum allowable fuel quantity;

second fuel quantity comparing means for comparing the second fuel quantity signal ($q_2$) to the another maximum allowable fuel quantity signal ($q_s$), selecting another lesser value of the second fuel quantity signal ($q_2$) and the another maximum allowable fuel quantity signal ($q_s$), and delivering a third fuel quantity signal ($q_3$) indicative of the magnitude of said selected another lesser value;

means for sensing the pressure of actuating fluid used to hydraulically actuate the injector and delivering an actuating fluid pressure signal ($P_f$) indicative of the magnitude of said sensed actuating fluid pressure; and converting means for receiving said third fuel quantity signal ($q_3$) and the actuating fluid pressure signal ($P_f$), converting the third fuel quantity signal ($q_3$) into a time duration signal ($t_d$) that is a function of at least the actuating fluid pressure signal ($P_f$), and delivering the time duration signal ($t_d$) to the injector to electronically control said fuel quantity.

4. The apparatus of claim 3 further including means for sensing the viscosity of actuating fluid used to hydraulically actuated the injector and delivering an actuating fluid viscosity signal (v) indicative of the magnitude of said sensed actuating fluid viscosity, said means for receiving said third fuel quantity signal ($q_3$) further receiving the actuating fluid viscosity signal (v) and converting the third fuel quantity signal ($q_3$) into a time duration signal ($t_d$) that is a function of at least the actuating fluid pressure signal ($P_f$) and the actuating fluid viscosity signal (v), and delivering the time duration signal ($t_d$) to the injector to electronically control said fuel quantity.

5. The apparatus of claim 3 wherein said torque control means receives the actual engine speed signal ($s_f$) and determines the maximum allowable fuel quantity ($q_t$) as a function of the actual engine speed signal ($s_f$).

6. The apparatus of claim 3 wherein said emission control means receives the actual engine speed signal ($s_f$) and determines the another maximum allowable fuel quantity ($q_s$) as a function of the actual engine speed signal ($s_f$).

7. The apparatus of claim 6 further including means for sensing air inlet pressure of the engine and delivering an air inlet pressure signal ($P_b$) indicative of the magnitude of said sensed air inlet pressure, said emission control means receiving the air inlet pressure signal ($P_b$) and determining the another maximum allowable fuel quantity ($q_s$) as a function of the actual engine speed signal ($s_f$) and the air inlet pressure signal ($P_b$).

8. The apparatus of claim 7 wherein the air inlet pressure is air inlet boost pressure.

9. The apparatus of claim 3 further including means for sensing ambient temperature and delivering an ambient temperature signal ($T_a$) indicative of the magnitude of said sensed ambient temperature, said emission control means receiving the ambient temperature signal ($T_a$) and determining the another maximum allowable fuel quantity ($q_s$) as a function of the actual engine speed signal ($s_f$), the air inlet pressure signal ($P_b$), and the ambient temperature signal ($T_a$).

10. The apparatus of claim 9 further including means for sensing ambient pressure and delivering an ambient pressure signal ($P_a$) indicative of the magnitude of said sensed ambient pressure, said emission control means receiving the ambient pressure signal ($P_a$) and determining the another maximum allowable fuel quantity ($q_s$) as a function of the actual engine speed signal ($s_f$), the air inlet pressure signal ($P_b$), the ambient temperature signal ($T_a$), and the ambient pressure signal ($P_a$).

11. The apparatus of claim 3 wherein said desired engine speed ($s_d$) is sensed from one of operator throttle setting, cruise control logic, power take off speed setting, and environmentally determined speed setting.

12. The apparatus of claim 3 wherein said torque control means determines a maximum allowable fuel quantity ($q_t$) that limits engine torque based on horsepower and torque characteristics of the engine.

13. An apparatus adapted for electronically controlling the timing of fuel injection by a hydraulically-actuated injector that injects fuel into an engine, said apparatus comprising:
converting means for receiving the desired timing signal (theta) and the actual engine speed signal ($s_f$), converting the desired timing signal (theta) into a corresponding time delay based on the desired timing signal (theta) and the actual engine speed signal ($s_f$), and delivering an uncorrected time delay signal ($t_u$) indicative of the magnitude of said time delay;
means for sensing the pressure of actuating fluid used to hydraulically actuate the injector and delivering an actuating fluid pressure signal ($P_f$) indicative of the magnitude of said sensed actuating fluid pressure;
time delay adjustment means for receiving the actuating fluid pressure signal ($P_f$) and determining a time delay adjustment based on the actuating fluid pressure signal ($P_f$), and delivering a time delay adjustment signal ($t_a$) indicative of the magnitude of the time delay adjustment;
time delay adjusting means for adjusting the uncorrected time delay signal ($t_u$) and producing a corrected time delay signal ($t_c$) in response to an adjustment between said uncorrected time delay signal ($t_u$) and the time delay adjustment signal ($t_a$), and delivering the corrected time delay signal ($t_c$) to the injector to initiate fuel injection.

14. An apparatus adapted for electronically controlling the initial timing of fuel injection by a hydraulically-actuated injector that injects fuel into an engine, said apparatus comprising:
means for sensing an actual engine speed and delivering an actual engine speed signal ($s_f$) indicative of the magnitude of said sensed actual engine speed ($s_f$);
means for sensing a desired fuel quantity and delivering a desired fuel quantity signal ($q_3$) indicative of the magnitude of said sensed desired fuel quantity;
timing control means for receiving the actual engine speed signal ($s_f$) and the desired fuel quantity signal ($q_3$), determining a desired fuel injection timing based on the actual engine speed signal ($s_f$) and the desired fuel quantity signal ($q_3$), and delivering a desired timing signal (theta) indicative of the magnitude of said desired fuel injection timing;
converting means for receiving the desired timing signal (theta) and the actual engine speed signal ($s_f$), converting the desired timing signal (theta) into a corresponding time delay based on the desired timing signal (theta) and the actual engine speed signal ($s_f$), and delivering an uncorrected time delay signal ($t_u$) indicative of the magnitude of said time delay;
means for sensing the pressure of actuating fluid used to hydraulically actuate the injector and delivering an actuating fluid pressure signal ($P_f$) indicative of the magnitude of said sensed actuating fluid pressure;
time delay adjustment means for receiving the actuating fluid pressure signal ($P_f$) and determining a time delay adjustment based on the actuating fluid pressure signal ($P_f$), and delivering a time delay adjustment signal ($t_a$) indicative of the magnitude of the time delay adjustment;
time delay adjusting means for adjusting the uncorrected time delay signal ($t_u$) and producing a corrected time delay signal ($t_c$) in response to a summation between said uncorrected time delay signal ($t_u$) and the time delay adjustment signal ($t_a$), and delivering the corrected time delay signal ($t_c$) to the injector to initiate fuel injection.

15. The apparatus of claim 14 further including means for sensing the viscosity of actuating fluid used to hydraulically actuate the injector and delivering an actuating fluid viscosity signal (v) indicative of the magnitude of said sensed actuating fluid viscosity; said time delay adjustment means receiving further receiving the actuating fluid viscosity (v) and determining the time delay adjustment based on both the actuating fluid pressure signal ($P_f$) and the actuating fluid viscosity signal (v), and delivering a time delay adjustment signal ($t_a$) indicative of the magnitude of the time delay adjustment.

16. A method of electronically controlling a quantity of fuel that a hydraulically-actuated injector injects into an engine, said method comprising the steps of:

determining a desired fuel quantity and delivering a first fuel quantity signal ($q_1$) indicative of the magnitude of said desired fuel quantity;

determining a maximum allowable fuel quantity, that limits at least one characteristic produced by the engine, and delivering a maximum allowable fuel quantity signal ($q_t$, $q_s$) indicative of the magnitude of said maximum allowable fuel quantity;

comparing the first fuel quantity signal ($q_1$) to the maximum allowable fuel quantity signal ($q_t$, $q_s$), selecting a lesser value of the first fuel quantity signal ($q_1$) and the maximum allowable fuel quantity signal ($q_t$, $q_s$), and delivering a second fuel quantity signal ($q_2$, $q_3$) indicative of the magnitude of said selected lesser value;

sensing the pressure of actuating fluid used to hydraulically actuate the injector and delivering an actuating fluid pressure signal ($P_f$) indicative of the magnitude of said sensed actuating fluid pressure; and receiving the second fuel quantity signal ($q_2$, $q_3$) and the actuating fluid pressure signal ($P_f$), converting the second fuel quantity signal ($q_2$, $q_3$) into a time duration signal ($t_d$) that is a function of at least the actuating fluid pressure signal ($P_f$) and the second fuel quantity signal ($q_2$, $q_3$), and delivering the time duration signal ($t_d$) to the injector (14) to electronically control said fuel quantity independent of fuel injection pressure.

17. The method of claim 16 further including the steps of:

sensing the viscosity of actuating fluid used to hydraulically actuate the injector and delivering an actuating fluid viscosity signal (v) indicative of the magnitude of said sensed actuating fluid viscosity, said means for receiving said second fuel quantity signal ($q_2$, $q_3$) further receiving the actuating fluid viscosity signal (v) and converting the second fuel quantity signal ($q_2$, $q_3$) into a time duration signal ($t_d$) that is a function of the actuating fluid pressure signal ($P_f$), the second fuel quantity signal ($q_2$, $q_3$), and the actuating fluid viscosity signal (v), and delivering the time duration signal ($t_d$) to the injector to electronically control said fuel quantity.

18. The apparatus of claim 1, wherein said characteristic is torque.

19. The apparatus of claim 1, wherein said characteristic is emissions.

20. The method of claim 16, wherein said characteristic is torque.

21. The method of claim 16, wherein said characteristic is emissions.

22. The apparatus of claim 3, wherein said speed comparing means produces an engine speed error signal ($s_e$) in response to a difference between said compared engine speed signal ($s_d$, $s_f$).

23. The apparatus of claim 13, wherein said time delay adjusting means produces a corrected time delay signal ($t_c$) in response to a summation between said uncorrected time delay signal ($t_u$) and the time delay adjustment signal ($t_a$).

* * * * *